United States Patent
Casale et al.

(10) Patent No.: US 12,297,336 B2
(45) Date of Patent: May 13, 2025

(54) MULTILAYER ASSEMBLY COMPRISING SILANE-GRAFTED POLYOLEFIN

(71) Applicant: FINPROJECT S.p.A., Morrovalle (IT)

(72) Inventors: Antonello Casale, Cremona (IT); Clara Malmassari, San Secondo Parmense (IT); Luciano Miozzo, Varese (IT)

(73) Assignee: FINPROJECT S.p.A., Morrovalle (IT)

( * ) Notice: Subject to any disclaimer, the term of this patent is extended or adjusted under 35 U.S.C. 154(b) by 91 days.

(21) Appl. No.: 18/166,193

(22) Filed: Feb. 8, 2023

(65) Prior Publication Data

US 2023/0203288 A1    Jun. 29, 2023

Related U.S. Application Data

(62) Division of application No. 16/306,638, filed as application No. PCT/EP2017/060461 on May 3, 2017, now abandoned.

(30) Foreign Application Priority Data

Jun. 9, 2016 (EP) .................................. 16173727

(51) Int. Cl.
| | |
|---|---|
| C08L 23/26 | (2006.01) |
| B32B 27/08 | (2006.01) |
| B32B 37/18 | (2006.01) |
| C08L 23/0807 | (2025.01) |
| C08L 23/0892 | (2025.01) |
| C08L 101/10 | (2006.01) |

(52) U.S. Cl.
CPC .......... *C08L 23/0815* (2013.01); *B32B 27/08* (2013.01); *B32B 37/182* (2013.01); *C08L 23/26* (2013.01); *B32B 2270/00* (2013.01); *B32B 2457/12* (2013.01); *C08L 23/0892* (2013.01); *C08L 101/10* (2013.01); *C08L 2203/204* (2013.01); *C08L 2205/025* (2013.01); *C08L 2205/05* (2013.01); *C08L 2312/08* (2013.01); *Y10T 428/31663* (2015.04)

(58) Field of Classification Search
CPC .. C08L 23/0815; C08L 23/26; C08L 23/0892; C08L 101/10; C08L 2203/204; C08L 2205/025; C08L 2205/05; C08L 2312/08; B32B 27/08; B32B 37/182; B32B 2270/00; B32B 2457/12; B32B 17/10036; B32B 17/1055; B32B 17/10935; Y02E 10/50; Y02E 10/52; C08F 8/42; C08F 210/16; C08F 2500/12
See application file for complete search history.

(56) References Cited

U.S. PATENT DOCUMENTS

| | | | |
|---|---|---|---|
| 4,603,153 A | 7/1986 | Sobajima et al. | |
| 8,795,570 B1 | 8/2014 | Parnell et al. | |
| 2006/0199911 A1* | 9/2006 | Markovich | C08L 23/0815 525/192 |
| 2008/0078445 A1* | 4/2008 | Patel | C08L 51/06 136/256 |
| 2014/0096825 A1 | 4/2014 | Bonekamp et al. | |

FOREIGN PATENT DOCUMENTS

| | | |
|---|---|---|
| EP | 2439239 A1 | 4/2012 |
| EP | 2804223 A1 | 11/2014 |
| FR | 2 960 238 A1 | 11/2011 |
| WO | 2008/036708 A1 | 3/2008 |
| WO | 2014/176088 A1 | 10/2014 |

OTHER PUBLICATIONS

Notice of Opposition from European Patent Office issued on Jul. 26, 2021 for corresponding European Application No. 17719858.7.

* cited by examiner

*Primary Examiner* — Michael B Nelson
(74) *Attorney, Agent, or Firm* — POLSINELLI PC

(57) ABSTRACT

The present invention relates to a silane-grafted polyolefin, to a multilayer composition comprising said polyolefin and to an article comprising said composition.

14 Claims, No Drawings

MULTILAYER ASSEMBLY COMPRISING SILANE-GRAFTED POLYOLEFIN

CROSS-REFERENCE TO RELATED APPLICATIONS

This application claims priority to and is a divisional of U.S. patent application Ser. No. 16/306,638, filed on Dec. 3, 2018, which is a national stage application (under 35 U.S.C. § 371) of PCT/EP2017/060461, filed May 3, 2017, which claims benefit of European Application No. 16173727.5, filed Jun. 9, 2016, which are incorporated herein by reference in their entireties for all purposes.

TECHNICAL FIELD

The present invention relates to a silane-grafted polyolefin, to a multilayer composition comprising said polyolefin and to an article comprising said composition.

BACKGROUND ART

Transparency, adhesion, efficiency and weather resistance are mandatory requirements of materials for encapsulation materials of photovoltaic modules and for several other application.

In general, photovoltaic modules that are commonly used to generate power by conversion of light, especially sunlight, into electricity have active components. i.e. the components capable of converting radiations into electricity, that are perishable and sensitive to moisture. For this reason, the active components of photovoltaic modules and similar devices need to be encapsulated in sheets of materials ("encapsulant") capable of providing protection from agents such as weather, dirt and pollution. In the most common design, the active component of the cell is protected with a sheet of glass, or of transparent plastics, on the side to be exposed to radiations ("front sheet") and with a polymeric or composite layer on the opposite side ("backsheet").

Common general practice is to use sheets of ethyl vinyl acetate copolymer (EVA) as encapsulant of the active material. Although it is widely used by virtue of its very low cost and common availability, EVA is affected by relevant disadvantages, mainly linked to the fact that it releases acetic acid, which promotes corrosion of ribbons and of other parts of the photovoltaic module. Release of acetic acid is generally followed by formation of double bonds or other chromophores, inducing yellowing or browning of the film, which ultimately results in lower transparency and diminished efficiency of the solar cells. The extent of EVA yellowing depends on the product formulation and on the ageing conditions of the module but the colour cannot be completely avoided. Moreover, EVA generally contains high levels of radical initiators, which can lower its adhesion to the glass sheet and eventually lead to disassembly of the module.

US 2006/0201544 A (INOUE, I.) 14 Sep. 2006 describes the production of photovoltaic modules using filler sheets formed of copolymers of recurring units comprising alpha-olefins and ethylenic unsaturated silane compounds, wherein the filler sheets formed via extrusion are laminated to the front/back sheets and to the other components through acrylic resin adhesive agent layers.

WO 2012/082261 A (DOW GLOBAL TECHNOLOGIES LLC) 21 Jun. 2012 describes photovoltaic cells, wherein films comprising alkoxysilane-containing polyolefin resins derived from alpha-olefins with reduced melt strength are used as encapsulants polyolefins derived from polyolefin elastomers, that are ethylene-octene copolymers, are used in the examples.

It was found that the copolymers used in the above references have significant drawbacks, notably they have low adherence and tend to lose it over time, similarly to the behaviour of EVA.

Thus, the need is still unmet for a material suitable to be used as encapsulant material for photovoltaic modules that overcomes the drawbacks of EVA and of the known olefin-based materials.

SUMMARY OF INVENTION

The present invention provides a cross-linkable polymer (SPO) comprising hydrolysable silane groups that is obtainable by polymerizing:
an olefin silane (OS) comprising hydrolysable silane groups of formula $R^1R^2R^3SiY$, wherein Y denotes a hydrocarbon radical comprising at least one vinyl functional group, $R^1$ is a hydrolysable group and $R^2$ and $R^3$ are, independently from each other, a $C_1$-$C_8$ alkyl group or are an hydrolysable group as $R^1$, and
a blend (CB) of at least two copolymer (c1) and (c2) of ethylene and a $C_6$-$C_{10}$ olefin, wherein the melt flow rate (MFR) of (c1) is lower than 8 g/10 min and the MFR of (c2) is higher than 10 g/10 min, as measured at 190° C. and 2.16 kg.

The present invention further provides a multilayer composition comprising:
(a) at least one layer of glass, metal or a polymeric material (PM), and
(b) a least one polymeric layer comprising a cross-linked polyolefin (XPO) obtainable by hydrolysis and condensation of a cross-linkable polyolefin comprising hydrolysable silane groups [cross-linkable polymer (SPO)] as defined above, wherein b) adheres directly to at least a portion of (a) and (PM) is different from (XPO) and (SPO).

The present invention also provides a process of the preparation of the multilayer composition as described above, comprising the steps of:
i. providing a layer (a) as defined above, preferably in the form of a sheet;
ii. applying on at least a portion of the layer (a) of step i. a composition comprising a cross-linkable polymer comprising hydrolysable silane groups (SPO), and optionally suitable additives; and
iii. cross-linking (SPO) to obtain a multilayer composition, wherein the cross-linked polyolefin (XPO) adheres directly to at least a portion of (a).

The present invention further provides an article comprising the multilayer composition as defined above.

DESCRIPTION OF EMBODIMENTS

Unless otherwise specified, in the context of the present invention the amount of a component in a composition is indicated as the ratio between the weight of the component and the total weight of the composition multiplied by 100 (also: "wt %" or "% in weight").

In the context of the present invention, the terms "adheres" and "adhesion" indicate that two layers are permanently attached to each other via their surfaces of contact, e.g. classified as 5B to 3B in the cross-cut test according to ASTM D3359, test method B. For the sake of clarity, the context of the present invention does not encompass multilayer compositions wherein a first layer and a second layer as described above for layers (a) and (b) are assembled by contacting, e.g. by pressing them together without permanent adhesion between the two layers, nor those wherein adhesion between the two layer is obtained by interposing, also partially, a third layer of adhesive substances, such as acrylic resins or the like.

In the context of the present invention, the term "cross-linkable polyolefin comprising hydrolysable silane groups [cross-linkable polymer (SPO)]" is understood to mean a polymer having one or more backbone chains consisting of recurring units derived from at least one hydrogenated monomer, preferably two or more monomers, as defined above and one or more hydrolysable silane pendant groups.

The cross-linkable polymer (SPO) is advantageously obtained from reaction of an olefin silane (OS) monomer comprising hydrolysable silane groups as defined hereunder and a blend of at least two copolymers, each comprising recurring units derived from ethylene and from a $C_6$-$C_8$ olefin such as hexene, octene, or decene, preferably octene such as 1-octene, 2-octene, 3-octene, 4-octene or mixtures thereof, preferably 1-octene.

By the term "hydrolysable silane groups" it is hereby intended to denote groups of formula —Si—O—X, wherein X is a hydrogen atom or an alkyl group, which, after hydrolysis and/or polycondensation, are capable of cross-linking by forming —Si—O—Si— links between various polyolefin chains.

Generally, the hydrolysable silane groups have formula $R^1R^2R^3SiY$, wherein Y denotes a hydrocarbon radical comprising at least one vinyl functional group, $R^1$ is a hydrolysable group and $R^2$ and $R^3$ are, independently from each other, a $C_1$-$C_8$ alkyl group or are an hydrolysable group as $R^1$, wherein preferably $R^1$ is chosen from radicals of the alkoxy, acyloxy, oxime, epoxy and amine type, more preferably $R^1$ is an alkoxy radical containing from 1 to 6 carbon atoms.

By the term "vinyl functional group" it is meant a chemical group comprising a carbon-carbon double bond ($CH_2$=$CH$—) and derivatives formed by substitution according to the definition in the IUPAC "Compendium of Chemical Terminology, 2nd ed" (the "Gold Book"). Compiled by A. D. McNaught and A. Wilkinson. Blackwell Scientific Publications, Oxford (1997).

The term "polyolefin comprising cross-linked silane groups [cross-linked polymer (XPO)]" is understood to mean a polymer having one or more backbone chains consisting of recurring units derived from at least one unsaturated monomer, i.e. bearing at least one C=C moiety, and one or more —Si—O—Si— links between said chains and/or one or more —Si—O— links between said chains and other surfaces such as the surface of the filler or of the other layer(s).

The cross-linked polymer (XPO) is advantageously obtainable by hydrolysis and/or polycondensation from the cross-linkable polymer (SPO).

Unexpectedly, the inventors found that cross-linkable polymers (SPO) deriving from blends of at last two ethylene/$C_6$-$C_{10}$ olefin copolymers ((c1) and (c2)) having different melt flow rates show improved adhesion to a substrate, as measured via compressive shear testing, with respect to the single copolymers (c1) and (c2) and to ethylene/$C_4$ olefin copolymers, alone or in blend with (c1) or (c2).

In the context of the present invention, the Melt Flow Rate (or Melt Flow Index, MFR) can be determined according to the methods known to the person skilled in the art, such as, but not limiting to, ISO 1133 standard procedure under a load of 2.16 Kg at 190° C.

Advantageously, in the composition of the invention the MFR of (c1) is lower than 8 g/10 min, preferably lower that 6 g/10 min, more preferably 5 g/10 min or lower, and that of (c2) is higher than 10 g/10 min, preferably 15 g/10 min or higher, or 30 g/10 min or higher, wherein all MFR values are measured according to ISO 1133 at 190° C. and 2.16 kg. As a general indication, the MFR of (c1) is not lower than 0.5 or 1 g/10 min and the MFR of (c2) is not higher than 80 or 70 g/10 min wherein all MFR values are measured according to ISO 1133 at 190° C. and 2.16 kg.

Preferably, in the cross-linkable polyolefin the weight ratio of (c1):(c2) in (CB) is from 80:20 to 20:80, more preferably from 75:35 to 35:75, 70:30 to 30:70 or from 60:40 to 40:60 or 50:50.

The cross-linkable polymer (SPO) typically comprises from 0.1% to 3%, preferably from 0.8% to 2.2% or 1.0% to 1.8% by weight, based on the total weight of the cross-linkable polymer (SPO), of hydrolysable silane groups as defined above.

The degree of crosslinking of the cross-linked polymer (XPO) may be determined according to techniques known to the person skilled in the art, such as according to EN ISO 10147.

The cross-linked polymer (XPO) typically has a degree of cross-linking of at least 40% by weight, preferably at least 50% by weight, more preferably of at least 65% by weight.

The cross-linked polymer (XPO) typically has a degree of cross-linking of at most 95% by weight, preferably of at most 80% by weight.

The degree of cross-linking of the cross-linked polymer (XPO) is defined as being the fraction of the cross-linked polymer (XPO) insoluble in hot xylene (extraction for eight hours at the boiling point of xylene according to EN ISO 10147 standard procedure) after hydrolysis and/or condensation of the cross-linkable polymer (SPO), that it is carried out by so-called moisture curing. Moisture curing can be made in ambient conditions (i.e. 23° C., 50% relative humidity), in hot water (from 40° C. to 95° C.), through a vapour stream at 115° C. or in Damp Heat Chamber (85° C., 85% relative humidity).

The cross-linkable polymer (SPO) according to the invention typically has a melt flow index comprised between 0.1 g/10 min and 70 g/10 min, preferably in the range between 1 to 20 g/10 min, more preferably in the range between 2 to 10 g/10 min as measured, for example, according to ISO 1133 standard procedure under a load of 2.16 Kg at 190° C.

The cross-linkable polymer (SPO) according to the invention preferably has a standard density comprised between 850 kg/m$^3$ and 960 kg/m$^3$, preferably between 860 kg/m$^3$ and 900 kg/m$^3$, more preferably between 870 kg/m$^3$ and 890 kg/m$^3$, more preferably between 870 kg/m$^3$ and 880 kg/m$^3$.

In the context of the present invention, as a non-limiting example, the standard density can be measured according to ASTM D792-08 standard procedure (method B, absolute ethanol).

The cross-linkable polymer (SPO) is typically obtainable by processing two or more polyolefins ((c1) and (c2)) in the presence of a compound comprising hydrolysable silane groups. (SPO) can contain further a homopolymer or a copolymers obtained from polymerization of one or more $C_2$-$C_8$ alkenes (component (c3)).

Said polyolefin (c3) is preferably a polyethylene such as an ethylene homopolymer or a copolymer of ethylene with another monomer selected from $C_3$-$C_8$ alkenes. Alternatively, the polyolefin (c3) is preferably a polypropylene such as an propylene homopolymer or a copolymer of propylene with another monomer selected from $C_3$-$C_8$ alkenes.

The polyolefin (c1), (c2) and, optionally, (c3) in the polymer (SPO) of the present invention is more preferably at least one or more blend of polyethylene made with different catalytic system as Ziegler-Natta, chromium, metallocene and non metallocene. Said polyolefin is more preferably at least one or more blend of polyethylene selected from a group of a low density polyethylene, a medium density polyethylene, a high density polyethylene, ultra high density polyethylene, a very low density polyethylene, ultra low density polyethylene and linear low density polyethylene according to the definition generally known to the person skilled in the art, e.g. according to the classification reported in ASTM D883-12 and in Ullmann's Encyclopedia of Industrial Chemistry 6th Edition, 2000, "Polyolefins".

The polyolefin (c1), (c2) and, optionally, (c3) in the polymer (SPO) of the present invention is preferably a polyethylene copolymer such as copolymer of ethylene with another monomer selected from $C_6$-$C_{10}$ alkenes, preferably from $C_6$-$C_8$ alkenes, preferably $C_8$ alkenes. The cross-linkable polymer (SPO) is generally manufactured by melt processing the blend of two or more polyolefins in the presence of a compound comprising hydrolysable silane groups and of a compound capable of generating free radicals.

Non-limitative examples of compounds comprising hydrolysable silane groups suitable for use in the manufacture of the cross-linkable polymer (SPO) include copolymers including recurring units bearing vinyl silanes.

The cross-linkable polymer (SPO) is generally manufactured by melt processing one or more polyolefins as indicated above in the presence of from 0.5% to 3.5% by weight, based on the total weight of the polyolefin(s), of a vinyl silane and from 0.01% to 0.5% by weight, based on the total weight of the polyolefin(s), of a compound capable of generating free radicals.

Very good results have been obtained with ultra low density polyethylene. It is preferable to use a blend of resins of ultra low density polyethylene, that is a blend of resins of copolymer of ethylene with another monomer selected from $C_6$-$C_{10}$ alkenes, preferably from $C_6$-$C_8$ alkenes, preferably $C_8$ alkenes.

The polyethylene used in the process for manufacturing the cross-linkable polymer (SPO) has a standard density comprised between 860 kg/m³ and 960 kg/m³, preferably between 860 kg/m³ and 880 kg/m³, more preferably between 865 kg/m³ and 875 kg/m³.

The polyethylene(s) has (have) a melt flow index comprised between 0.1 g/10 min and 70 g/10 min, more preferably between 3 g/10 min and 40 g/10 min, as measured according to ISO 1133 standard procedure under a load of 2.16 Kg at 190° C.

The polyethylene(s) has (have) a melting temperature comprised between 30° C. and 140° C., preferably between 40° C. and 70° C., wherein the melting temperature is measured according to ISO 306.

By the term "compound capable of generating free radical" it is hereby intended, for example, peroxides and azo compounds, or by ionizing radiation, etc. A suitable azo-compound is azobisisobutyl nitrile (AIBN).

As non-limiting examples, suitable radical initiators are those reported in WO 2012/082261 A (DOW GLOBAL TECHNOLOGIES, LLC) Jun. 21, 2012 Organic free radical are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di-(t-butyl peroxy)-hexane, lauryl peroxide and tert butyl peracetate.

By the term "vinyl silane" it is hereby intended to denote a silane comprising at least one vinyl functional group. The vinyl silane used in the process for manufacturing the composition (C) is usually a vinyl silane of formula $R^1R^2R^3SiY$, wherein Y denotes a hydrocarbon radical comprising at least one vinyl functional group, $R^1$ denotes a hydrolysable group and $R^2$ and $R^3$ denote, independently, an alkyl group or a hydrolysable group $R^1$. The hydrolysable group $R^1$ may be chosen from radicals of the alkoxy, acyloxy, oxime, epoxy and amine type. $R^1$ is preferably an alkoxy radical containing from 1 to 6 carbon atoms.

It is preferred to use a vinyl silane of formula $R^1R^2R^3SiY$, wherein $R^2$ and R3 are also hydrolysable groups R1 as defined above.

Good results have been obtained with vinyltrialkoxysilanes wherein $R^1$, $R^2$ and $R^3$ are alkoxy groups containing from 1 to 4 carbon atoms. Particularly preferred are vinyltriethoxysilane and vinyltrimethoxysilane.

The amount of vinyl silane used in the process for manufacturing (SPO) is preferably comprised between 1.3% and 2.6% preferably from 1.5 to 2.0 or from 1.6 to 1.8% by weight, based on the total weight of the polyolefin(s).

Composite material (C) can be mixed (via addition, suitably during compounding or extrusion/injection) with a specific catalytic masterbatch (CM) containing, but not limited to, anti-oxidants and/or UV absorbers and/or flame retardants and/or anti-dripping agents and/or pigments and reflective materials and/or silanol condensation catalyst and/or down/up converter. As used herein, the term "down/up converter" indicates one or more organic/inorganic molecule(s) or complex or salt(s) or blend of them, that is able to absorb of one or more photons and leads to the emission of light at shorter or higher wavelength than the excitation wavelength. A non-limiting example is the conversion of infrared light to visible light. Materials by which down/up conversion can take place often contain ions of d-block and f-block elements. Non-limiting examples of these ions are $Ln^{3+}$, $Ti^{2+}$, $Ni^{2+}$, $Mo^{3+}$, $Re^{4+}$, $Os^{4+}$, and the like.

As non-limiting example, suitable anti-oxidants can be chosen from a wide range of known anti-oxidants that are compatible with polyolefins. Examples include but are not limited to phenolic or phosphitic anti-oxidants, such as alkylated monophenols, alkylthiomethylphenols, hydroquinones, alkylated hydroquinones, tocopherols, hydroxylated thiodiphenyl ethers, alkylidenebisphenols, acylaminophenols. Other examples include but are not limited to O-, N- and S-benzyl compounds, hydroxybenzylated malonates, aromatic hydroxybenzyl compounds, triazine compounds, aminic antioxidants, aryl amines, diary) amines, polyaryl amines, oxamides, metal deactivators, phosphites, phosphonites, benzylphosphonates, ascorbic acid (vitamin C), compounds which destroy peroxide, hydroxylamines, nitrones, benzofuranones, indolinones, and the like and mixtures thereof. More preferably, the antioxidant is a member of the class of bis-phenolic antioxidants. Suitable specific bis-phenolic antioxidants include 2,2'-ethylidenebis(4,6-di-t-butylphenol); 4,4'-butylidenebis(2-t-butyl-5-methylphenol); 2,2'-isobutylidenebis(6-t-butyl-4-methylphenol); and 2,2'-methylenebis(6-t-butyl-4-methylphenol). Some commercially available bis-phenolic antioxidants include ANOX® 29, LOWINOX® 22M46, LOWINOX® 44B25, and LOWINOX® 221 B46.

Typical examples of UV absorbers include but are not limited to triazines, benzotriazoles, hydroxybenzophenones, hydroxyphenyltriazines, esters of benzoic acids, and mixtures of two or more thereof. Further examples include cyclic amines. Examples include secondary, tertiary, acetylated, N-hydrocarbyloxy substituted, hydroxy substituted N-hydrocarbyloxy substituted, or other substituted cyclic amines which are further characterized by a degree of steric hindrance, generally as a result of substitution of an aliphatic group or groups on the carbon atoms adjacent to the amine function.

Examples of flame retardants include but are not limited to halogenated aromatic compounds, like halogenated biphenyls or biphenyl ethers and bisphenols. Typically the halogenated materials are brominated or polybrominated. Specific examples include bisphenols like polybrominated biphenyl, penta-, octa- and deca-brominated diphenyl ethers (BDE's), tetrabromobisphenol-A (TBBPA). Further examples include but are not limited to inorganic compounds like alumina trihydrate, antimony oxide, magnesium hydroxide, zinc borate, organic and inorganic phosphates, red phosphor and combinations thereof.

Typically, anti-dripping agents include, but are not limited to, fluoropolymers, such as a polytetrafluoroethylene polymers and copolymers. The anti-dripping agents may be dispersed in or blended with the polymer making up the respective layer. Commercial examples of anti-dripping agents include MM5935EF from Dyneon® LLC, ALGOFLON® DF210 from Solvay Specialty Polymers or ENTROPY® TN3500 from Shanghai Entropy Chemical.

Pigments may be inorganic or organic. Pigments may be of green, blue, red, pink, purple and white colour. Most commonly used white pigments are inorganic pigments. Examples include but are not limited to zinc oxides and titanium oxides (like $TiO_2$) or carbon particles. The pigments may be dispersed, blended or dissolved in the layer but may be painted or printed onto a layer.

Reflective materials include glass particles or metal particles, with glass particles being preferred. They may be dispersed, blended or dissolved in a layer.

A catalytic masterbatch can be added in an amount from 0.5 to 10% by weight, more preferably from 2 to 5% by weight, based on the total weight of the polyolefin(s); the amount is strongly depending the performances required to specific end use, as known to the person skilled in the art.

By the term "silanol condensation catalyst" it is hereby intended the system able to accelerate the reaction of hydrolysis and/or condensation the cross-linkable polymer (SPO) that it is carried out by so-called moisture curing, such as in WO 91/07075 A (NESTE OY) Jun. 27, 1991. Prior art silanol condensation catalyst include carboxylates of metals, such as tin, zinc, iron, lead and cobalt, organic bases, inorganic acids, and organic acids. Special mention should be made of dibutyl tin dilaurate, dibutyl tin diacetate, dioctyl tin dilaurate, stannous acetate, stannous caprylate, zinc caprylate, ethyl amines, dibutyl amine, hexylamines. Inorganic acids such as sulphuric acid as well as organic acids such as toluene sulphonic acid, stearic acid and maleic acid can also be uses. Preferably the silanol condensation catalyst is a metal carboxylate, more preferably a tin carboxylate.

The compositions of the present invention have similar, or improved starting performances with respect to the known compositions in terms of adhesion, efficiency, transparency and weather resistance in multilayer assembly. The adhesion of the compositions of the present invention to the substrates improves over time, whereas conventional materials such as EVA tend to lose adhesion to the substrates over time.

Layer (a) is preferably formed of glass, such as high transparency glass, metal (such as aluminium, titanium their alloys or steel) or of (PM) that is selected from the group consisting of polycarbonates, acrylic polymers, polyacrylates, cyclic polyolefins such as ethylene norbornene, metallocene-catalyzed polystyrene, polyethylene terephthalate (PET), polyethylene terephthalate bioriented (BOPET), polyethylene naphthalate, fluoropolymers such as ETFE (ethylene-tetrafluoroethylene), PVF (polyvinyl fluoride), FEP (fluoroethylene propylene), ECTFE (ethylene chlorotrifluoroethylene), PVDF (polyvinylidene fluoride), and laminates, mixtures or alloys of two or more thereof.

Layer (a) is preferably formed of PET, ECTFE or glass, more preferably it comprises, or consists of, glass.

When used in certain embodiments of the present invention, "glass" refers to a hard, brittle, transparent solid, such as that used for windows, many bottles, or eyewear, including, but not limited to, soda-lime glass, borosilicate glass, acrylic glass, sugar glass, phyllosilicates such as mica (isinglass or Muscovy-glass), or aluminum oxynitride. In the technical sense, glass is an inorganic product of fusion which has been cooled to a rigid condition without crystallizing. Many glasses contain silica as their main and glass-former component.

Pure silicon dioxide ($SiO_2$) glass (the same chemical compound as quartz, or, in its polycrystalline form, sand) does not absorb UV light and is used for applications that require transparency in this region. Large natural single crystals of quartz are pure silicon dioxide, and upon crushing are used for high quality specialty glasses. Synthetic amorphous silica, an almost 100% pure form of quartz, is the raw material for the most expensive specialty glasses.

The glass layer of the multilayer composition according to the invention is typically one of, without limitation, window glass, plate glass, silicate glass, sheet glass, float glass, colored glass, specialty glass which may, for example, include ingredients to control solar heating, glass coated with sputtered metals such as silver, glass coated with antimony tin oxide and/or indium tin oxide, E-glass and similar materials.

The multilayer composition can be uses for different applications as, but not limited to, healthcare, plumbing, safety glass and safety glass windows, packaging, one or more electronic devices included, but not limited to, solar cells rigid or flexible modulus (also known as photovoltaic cells), liquid crystal panels, electro-luminescent devices and plasma display units, DSSC (Day Sensitize Solar Cells).

XPO can be used as encapsulant, for example in a photovoltaic cell, or sealant in shape of film or strip layer and it need to adhere with other layers in laminated or co-extrude multilayer assembly.

In an embodiment of the present invention, the (XPO) is used as encapsulant layer in photovoltaic (PV) cell or modulus. In such devices, the encapsulant need not only to adhere at different substrates but also to protect cells from moisture and other types of physical damage, to guarantee optical clarity and physical retention properties at high temperature and all requirements indicated in IEC 61215 standard for PV cells. The encapsulants as described above that are based on (SPO) can be used in various PV technologies as, but not limited to, crystalline silicon, polycrystalline silicon, amorphous silicone, copper indium gallium (di)selenide (GIGS), copper indium selenide (CIS), cadmium telluride, gallium arsenide, CdTE, OPV, dye-sensitized materials and perovskite.

The typical polymeric encapsulant materials generally used for these purposes include silicon resins, epoxy resins, polyvinyl butyral resins (PVB), cellulose acetate, ethylene-vinyl acetate copolymer (EVA), ethylene-vinyl acetate copolymer cross-linked by peroxide method (EVA cross-linked), ionomers and thermoplastic polyolefins.

In another aspect, the present invention provides a process for the production of the film for encapsulant application as defined above, comprising the steps of:
(I) providing a polyolefin comprising cross-linkable silanol group (SPO) as defined above, which, optionally, can be physically blended with catalytic masterbatch (CM) as defined above;
(II) extruding (SPO), which optionally includes (CM), in the form of a film;
(III) optionally, partial cross-linking of the (SPO) silanol groups.

Optionally, cross-linking of the silanol groups of (SPO) is completed after assembly of the multilayer structure. The polyolefin comprising cross-linkable silanol groups (SPO) can be prepared in form of pellet, powder flakes or powder, preferably in pellet form. Any conventional method can be used, reactive extrusion being preferred. The most common reactive extrusion methods useful for the preparation of (SPO) are named Monosil™ (one step) and Sioplas™ (two-step) reactive process.

The one-step Monosil™ process was developed by Maillefer as a one-step-process where all of the components of the polyolefin base resin, additives, peroxide and silane are grafted in a specialized compounding extruder which also extrudes the film in-line.

The two-step Sioplas™ process was invented and patented by Dow Corning. This process requires extruding (SPO) from a reactive compound composed of silane groups which have been grafted onto polyolefin (PO) polymer chains by the addition of organic peroxide in an offline compounding process.

One preferred method is blending cross-linkable polymer (PO), vinyl silane and free radical generator, in any conventional reactor extruder, such as, but not limited to, a Buss kneader or mono or twin screw, preferably a twin screw extruder. The conditions can vary depending upon the residence time and the half-life of the free radical generator but the temperatures profile is typically in the range from 110 to 190° C., depending mostly from the melting temperature of the PO.

In an aspect, the present invention is relative to a process for the preparation of the multilayer composition as defined above, comprising the steps of:
i. providing a layer (a) as defined above comprising glass, metal or a polymeric material (PM) different from (XPO), preferably in the form of a sheet;
ii. applying on at least a portion of the (a) layer of step i. a composition comprising a cross-linkable polymer comprising hydrolysable silane groups (SPO) as defined above, and optionally suitable additives;
iii. cross-linking the (SPO) to obtain a multilayer composition, wherein the cross-linked polyolefin (XPO) adheres directly to at least one portion of (a).

The cross-linkable polymer comprising hydrolysable silane groups (SPO) can optionally be partially cross-linked prior to its application to the layer (a) in step ii. The partial cross-linking of the (SPO) can be carried out during its preparation, e.g. during extrusion of the layer in the form of a film, or after its preparation in the form of a sheet or film. Typically, after that step, the cross-linking degree is in the range from 0% to 30%, preferably from 0% to 10%, preferably from 0% to 5%. The step of partial cross-linking needs to be evaluated for obtaining the good balance between the properties of the portion not cross-linked, that is necessary to allow the multilayer assembly process, and those of the cross-linked portion, that is necessary to ensure the final performance required, expecially in term of creep at high temperature.

In the step iii. of the process according to the invention the layer (b) of the multilayer composition can be partially or totally cross-linked.

Optionally, in the step iii. of the process according to the invention the multilayer composition can be totally cross-linked to achieve the higher performances, especially in terms of adhesion, thermal resistance, creep at temperature above the melting temperature of SPO. The maximum cross-linking degree of step (iii), typically, is in the range from 50% to 90%, preferably from 60% to 80%. It was found that by cross-linking the multilayer assembly for more than 500 hours in a damp heat chamber (85° C.; 85% relative humidity) the adhesion, with different layers, increases.

The partial or total cross-linking of the (SPO) silanol groups can be carried out by any curing method using moisture, which accelerates the cross-linking process.

It is possible, but not necessary, to add a catalytic masterbatch, that can be mixed together with (SPO) in a step (ii). The catalytic masterbatch promotes a faster cross-linking in the multilayer assembly and allows to achieve an higher performance, especially in terms of resistance to creep at temperature above the melting temperature of SPO.

As non-limiting examples, the film can be formed by any of the conventional extrusion method such as casting, doctor blade, lamination, spin coating, dip coating, co-extrusion, by hydraulic pressure, film extrusion, cast extrusion, preferably by film extrusion. The typical temperatures profile is in the range from 120° C. to 180° C., depending mostly from the melting temperature of the (SPO) being used.

In an aspect, the present invention provides an article comprising the multilayer composition as described above.

In an aspect the present invention provides a photovoltaic (PV) cell, which comprises at least the following layers: a "frontsheet" layer (FS), a first encapsulant layer, a solar cell, a second encapsulant layer and a "backsheet" (BS) layer, wherein at least the frontsheet" layer (FS) and the first encapsulant layer are formed of the multilayer composition comprising layers (a) and (b) as defined above.

In the context of the invention, by "frontsheet" layer (FS) it is intended to denote the outer layer of a PV cell which is exposed to the environment and to incident electromagnetic radiation. The FS of the PV cell of the invention is described above as layer (a). The thickness of FS layer is not particularly limiting, preferably it is 6 mm or below. The optically transparent layer FS advantageously has a transmittance of at least 70%, preferably of at least 80%, more preferably of at least 85% of the incident electromagnetic radiation, as measured according to ASTM D1003 standard procedure under atmospheric air.

The first encapsulant layer in the PV cell of the invention is described above as layer (b). The thickness of the first encapsulant layer in the PV cell is not critical and it may depend on the use for which said assembly is intended. In general, for PV cells the preferable thickness is in the range from 200 microns to 600 microns.

For the solar cell, i.e. the active component, in the PV cell of the invention different PV technologies can be used as described above.

The second encapsulant layer in the PV cell of the invention can be preferably composed of the (XPO) polymer as described above or it can be composed of a polymer different from (XPO).

The thickness of the second encapsulant layer in the PV cells is not critical and will depend on the use for which said assembly is intended. For PV cells according to the invention, its preferable thickness is in the range from 200 microns to 600 microns.

In the PV cell according to the invention, a "backsheet" (BS) layer is present that is the outermost layer of the PV module and is designed to protect the inner components of the module, specifically the photovoltaic cells and electrical components from external stresses as well as act as an electric insulator. The thickness of the BS layer is not particularly limited as it depends on the type of material used, preferably it is less than 6 mm.

Each of the FS and BS layers can be made by one or more of the known rigid or flexible sheet materials, included for example, glass, high transparency glass, polycarbonate, acrylic polymers, polyacrylate, a cyclic polyolefin such as ethylene norbornene, metallocene-catalyzed polystyrene, polyethylene terephthalate (PET), polyethylene terephthalate bioriented (BOPET), polyethylene naphthalate, fluoropolymers such as ETFE (ethylene-tetrafluoroethylene), PVF (polyvinyl fluoride), FEP (fluoroethylene propylene), ECTFE (ethylene chlorotrifluoroethylene), PVDF (polyvinylidene fluoride) and many other types of plastic, polymeric or metal materials, included laminates mixtures or alloys of two or more these materials as known to the person skilled in the art (ref. patent WO 2012/082261 A (DOW GLOBAL TECHNOLOGIES LLC) 21 Jun. 2012 par. [0054])

In general, the multilayer assembly can be made in a different ways as, but not limited to, compression in temperature, lamination process. For assembling the system typically the temperature, time and other parameters are set to ensure the sufficient adhesion between the layers.

In another aspect the present invention provides also an article suitable for use in glass safety and glass safety windows, which comprises at least the following layers: a "frontsheet" layer (FS); as describe in multilayer assembly for PV cells, an encapsulant layer; as describe in multilayer assembly for PV cells and a "backsheet" (BS) layer; as describe in multilayer assembly for PV cells.

The compositions according to the following examples have shown superior performances over time (aging in Damp Heat standard conditions, i.e. 85° C. and 85% relative humidity) as encapsulants in terms of adhesion (Peeling test), durability (mini-modulus efficiency) and weather resistance in multilayer assembly (in the specific case for PV cells) in applications where maintaining good transparency (Total Transmittance, Haze, Yellow Index, Withe Index, UV-Vis, NIR) over time is a must. Some results have been compared, using the same samples preparation, with cross-linked EVA as first and second encapsulants, that is widely used as encapsulant for PV cells.

Should the disclosure of any patents, patent applications, and publications which are incorporated herein by reference conflict with the description of the present application to the extent that it may render a term unclear, the present description shall take precedence.

The following examples are provided to illustrate the invention, without intention to limit its scope.

Experimental Part

Four different types of polyolefine encapsulants with silane grafting were prepared by mixing one or two polyolefin(s) with a vinylsilane. One comparative EVA-containing encapsulant was also prepared.

The SPO film was prepared in the following steps:

Step a): a polyolefin comprising cross-linkable silanol group (SPO) was prepared in form of pellets via Sioplast™ reactive process with extrusion in a twin screw extruder, the temperatures profile is in the range from 120 to 160° C.

Step b): In this example, the SPO has not been blended with catalytic masterbatch (CM)

Step c): the SPO was extruded in form of film (200 or 400 or 600 micron of thickness), the temperatures profile was in the range from 130 to 160° C.

The polyolefin comprising cross-linkable silanol groups (SPO) can be prepared in form of pellets, flakes or powder, preferably in pellet form. Any conventional method can be used, the common are named Monosil™ (one step) and Sioplas™ (two-step) reactive process; one preferred method is blending cross-linkable polymer (PO), vinyl silane and free radical generator, in any conventional reactor extruder, such as, but not limited to, a Buss kneader or mono or twin screw, preferably a twin screw extruder. The conditions can vary depending upon the residence time and the half-life of the free radical generator but the temperatures profile is typically in the range from 110 to 190° C., depending mostly from the melting temperature of the PO.

Table 1 shows the polyolefins/blend of polyolefins used in the examples (% amounts are in weight of the component based on the total weight of the components (c1) and (or (c2)). In all comparative examples 1-3 and inventive examples 4, 4a (same composition as 4) and 5, the amount of vinyl silane is from 1.4 to 1.8% by weight based on the total weight of the polyolefin(s).

TABLE 1

| Polyolefin | A | CO 1 | B | C | CO 2 |
|---|---|---|---|---|---|
| MFR 190° C. 2.16 kg | 5 | 5 | 30 | 15 | 35 |
| Monomers composition | Ethylene/ octene | Ethylene/ butene | Ethylene/ octene | Ethylene/ octene | Ethylene/ butene |
| Comp Ex 1 | 100% | — | — | — | — |
| Comp Ex 2 | 70% | — | — | — | 30% |
| Comp Ex 3 | — | 100% | — | — | — |
| Ex 4/4a | 70% | — | 30% | — | — |
| Ex 5 | 70% | — | — | 30% | — |

The EVA used as comparative material in the experiment is a 0.45 mm thick EVASKr S88 from Bridgestone.

Adherence to Glass

In order to compare the encapsulants at similar thicknesses, in the mechanical and optical testing two layers of polyolefine having the same thickness and only one layer of EVA were used in the sample preparation.

The encapsulants were extruded to the thickness indicated below and 30 cm width.

Two layers of each of the different encapsulants were laminated in a vacuum laminator between two glass plates (100×100×3.0 mm, Eurowhite quality) with a standard cycle used for EVA (150° C., 300 s pumping, 600 s curing). Prior to encapsulation the glasses were cleaned with isopropanol. The laminated samples were then cut with an automated diamond saw down to 25×25 mm samples and tested in a Compressive Shear Testing (CST) set up. Part of the samples were aged in Damp Heat (DH) conditions (85° C., 85% relative humidity, RH) for 300 h and then tested.

Each reported value is the average of 5 measurements. To avoid possible inconsistencies in the mechanical properties of the encapsulants, for all the samples the direction of the applied shear stress corresponded to the extrusion direction.

The results of CST testing are expressed in terms of "stored elastic energy" needed to start delamination of the samples during the applied shear stress. The higher this value the more resistant to delamination will be the encapsulant/glass interface.

Results

The laminated 10×10 cm glass/glass samples did not show visually any bubble or delamination after lamination.

The Compressive Shear Testing results are summarized in Tables 2 and 3 and show different behaviours for the different encapsulants. In Table 2 are shown the values of Compressive Shear Testing carried out using two layers of polyolefine (2×0.35 mm) and only one layer of EVA (0.8 mm) were used in the sample preparation.

TABLE 2

| Sample | Stored elastic energy (mJ/mm$^3$) |
| --- | --- |
| Comp Ex. 1 | 3 |
| Comp Ex. 2 | 4 |
| Ex. 4 | 11 |
| Ex. 5 | 8 |
| Comp Ex EVA | 27 |

The compositions of examples 4 and 5, according to the invention, which comprise a blend of an ethylene/octene polyolefin having high MFR with an ethylene/octene polyolefin having low MFR, have notably higher resistance to delamination with respect to the comparative compositions which comprise only a ethylene/octene polyolefin having low MFR (Comp. Ex. 1, containing polyolefin A) or a mixture of the same ethylene/octene polyolefin with a ethylene/butene polyolefin (CO 2) having high MFR (Comp. Ex. 2).

The Compressive Shear Testing results obtained for samples before and after aging for 300 hours in Damp Heat conditions are summarized in Table 3 and show a different behaviour for the different encapsulants.

In order to compare the encapsulants at similar thicknesses, two layers of polyolefine having the same thickness (2×0.2 mm) for comparative example 3 and example 4a according to the invention and only one layer of EVA (0.45 mm, comparative example 3a) were used in the sample preparation.

TABLE 3

| | Stored elastic energy (mJ/ mm$^3$) | |
| --- | --- | --- |
| Sample | Initial values | After 300 hours aging in DH (85° C., 85% RH) |
| Comp Ex. 3 | 7.5 | 5 |
| Ex. 4a | 25 | 39 |
| Comp EVA | 39 | 19 |

All the observed delaminations were of adhesive nature, i.e. they were located at the glass/encapsulant interface and not within the encapsulant itself.

The values of this series of measurements are higher than the values of the series of samples of Table 2. This difference can be empirically explained by higher thickness of the encapsulate of the first series compared to the second series (from about 0.7 mm to about 0.4 mm for polyolefins and from about 0.8 mm to about 0.45 mm for EVA). Due to non-linearity in the thickness-shear force behaviour the overall energy needed for sample failure tend to decrease with increasing encapsulant thickness.

The formulation of Comparative Example 3a shows the lowest values before and after aging.

The formulation of Example 4 shows an high initial value and a remarkable increase over time. On the contrary, in comparative example 6, wherein EVA is used as the encapsulant, the adhesion after 300 hours of aging under Damp Heat conditions decreases to about half of the initial value.

Optical Properties

One layers of each of the different encapsulants was laminated in a vacuum laminator between two glass plates (5×5×3.2 cm, from F-Solar, Solarfloat type T quality) with a standard cycle used for EVA (155° C., 300 s pumping, 900 s curing). After lamination the samples were cooled in air.

The samples were then measured with a Perkin Elmer UV-VIS instrument in a 320-2000 nm wavelength range. Both total transmission (TT) and diffuse transmission (DT) curves were acquired and the Haze (defined as the DT/TT ratio) was then calculated at 400 nm.

The results can be evaluated in terms of percentage of transmitted light (total or diffuse). The higher the TT the higher will be the light reaching the solar cell. Concerning the diffuse light, the lower is the Haze value and the lower will be the milky appearance of the PV module and the batter its aesthetically acceptance.

All tested compositions have a DT/TT ratio at 400 nm (the so called "Haze factor") ranging between 5-8%, that is an acceptable value for the intended applications in the photovoltaic area. From the practical point of view it is commonly observed that only starting from Haze factors higher that 10-15% a milky appearance can be appreciated by bare eye and the value measured for the samples according to the invention are therefore not relevant to impact the aesthetical acceptance.

The above data demonstrate that the compositions according to the invention have higher resistance to peeling that those comprising polyolefins different from (c1 and (c2) as defined above. In addition, the high resistance to peeling of the compositions according to the invention increases upon aging in Damp Heat conditions, whereas that of conventional encapsulants comprising EVA rapidly decreases to unacceptable levels under the same conditions.

In addition, all compositions according to the present invention showed acceptable transparency in optical property tests (haze lower than 9%), that is suitable for application in photovoltaic cells and similar devices.

PV Cell Efficiency

To evaluate efficiency of a photovoltaic cell comprising the multilayer material according to the invention, the mini-modulus PV cell (20 cm*20 cm) was prepared by lamination process (150° C., 300 s pumping, 900 s curing) and comprises the following layers:

A "frontsheet" layer (FS) with high transparency glass_for PV-grade, low iron, 3.0 mm thickness;
A first encapsulant layer;
A solar cell made with poly-Silicon solar;
A second encapsulant layer;
A "backsheet" layer (BS) with high transparency glass_for PV-grade, low iron, 3.0 mm thickness.

In the cell according to the invention, the cross-linkable polymer (XPO) (film, 400 micron of thickness) as defined above was used as first and second encapsulant layers, and in a comparative example a PV cell was prepared using EVA (commercially available film, 450 micron of thickness).

PV cell efficiency was measured at 25° C. with a solar simulator, according to IEC EN 61215 10.13. For sake of clarity, figures regarding PV efficiency and other performances are normalized (100% at t=0 for each value and each module) in Table 4 are reported the values obtained.

Aging tests was carried out in Damp Heat chamber (DH) at 85% humidity, 85° C. for different times (500, 1000, 2000, 3000 hours), according to IEC EN 61215.

TABLE 4

Table 4: Mini-modulus efficiency of PV cell according to the invention.

| Encapsulant | | 500 h DH | 1000 h DH | 2000 h DH | 3000 h DH |
|---|---|---|---|---|---|
| XPO | Isc (%) | 100 | 100 | 100 | 100 |
| | Fill Factor (%) | 99 | 99 | 98 | 98 |
| | Normalized Efficiency (%) | 98 | 100 | 97 | 96 |

Cells comprising the multilayer compositions according to the invention as FS and BS maintained excellent efficiency of operation over time, with a slight improvement with respect to the initial values after 1000 h in DH.

In comparative examples, during aging in DH, it was observed that cross-linked EVA (laminated with high transparency glass as FS and BS) loses the efficiency after 1000 hours and it does not reach the limits required, according to IEC 61215 for PV application.

Example 4. Mini-modulus PV cell (20 cm*20 cm) laminated with Halar® UV blocking as FS and BS. Comparison between SPO grade and cross-linked EVA.

TABLE 5

Table 5: Mini-modulus PV cell efficiency

| Encapsulant | | 1000 h DH | 2000 h DH |
|---|---|---|---|
| SPO | Isc (%) | 100.05 | 98.74 |
| | Fill Factor (%) | 93.33 | 95.55 |
| | Normalized Efficiency (%) | 93.70 | 93.46 |

TABLE 5-a

Table 5-a: Mini-modulus PV cell efficiency; comparative example

| Encapsulant | | 1000 h DH | 2000 h DH |
|---|---|---|---|
| EVA | Isc (%) | 96.35 | 61.72 |
| | Fill Factor (%) | 92.46 | 50.14 |
| | Normalized Efficiency (%) | 88.72 | 28.18 |

As shown in Tables 5-5a, during aging in DH conditions, cross-linked EVA (laminated with Halar UV blocking as FS and BS) loses the efficiency after 1000 hours and after 2000 hours it does not achieve the limit required according to IEC 61215 for PV application. The module comprising the composition according to the invention maintains very good efficiency also after 3000 hours.

The invention claimed is:

1. A photovoltaic cell comprising at least a front sheet layer (a) and a first encapsulant layer (b) forming a multilayer composition wherein:
   layer (a) is at least one layer of glass, of a metal or of a polymeric material (PM), and layer (b) is a least one polymeric layer comprising a cross-linked polyolefin (XPO) obtained by hydrolysis and condensation of a cross-linkable polyolefin (SPO) having one or more backbone chains consisting of recurring units derived from ethylene and octene and comprising hydrolysable silane groups, the cross-linkable polymer (SPO) being obtained from the reaction of: cross linkable polymer (SPO) comprising hydrolysable silane groups that is obtainable from reaction of:
   an olefin silane (OS) of formula $R^1R^2R^3SiY$, wherein Y is vinyl, $R^1$, $R^2$ and $R^3$ are, independently from each other, a $C_1$-$C_4$ alkoxy group, with
   a blend (CB) of at least two copolymers (c1) and (c2) each of ethylene and octene, wherein:
   the melt flow rate (MFR) of (c1) is lower than 6 g/10 min, but not lower than 1 g/10 min and the MFR of (c2) is 15 g/10 min or higher, but not higher than 70 g/10 min, as measured at 190° C. and 2.16 kg according to ISO 1133;
   the weight ratio of (c1): (c2) in (CB) is from 70:30 to 60:40;
   wherein the cross-linkable polyolefin (SPO) comprises from 1.4% to 1.8% by weight of hydrolysable silane groups, based on the total weight of (SPO); and
   wherein b) adheres directly to at least a portion of (a) and (PM) is different from (XPO).

2. The photovoltaic cell according to claim 1, wherein (XPO) has a degree of cross-linking of at least 40% by weight, measured according to EIN ISO 10147.

3. The photovoltaic cell according to claim 1, wherein (XPO) has a degree of cross-linking of at most 95% by weight, measured according to EIN ISO 10147.

4. The photovoltaic cell according to claim 1, wherein layer (a) comprises a (PM) selected from the group consisting of polycarbonates, acrylic polymers, polyacrylates, cyclic polyolefins, metallocene-catalyzed polystyrene, polyethylene terephthalate (PET), polyethylene naphthalate, fluoropolymers, and laminates, mixtures or alloys of two or more thereof.

5. The photovoltaic cell according to claim 1, wherein layer (a) comprises or consists of glass.

6. The photovoltaic cell according to claim 5, wherein (XPO) has a degree of cross-linking of at least 40% by weight, measured according to EIN ISO 10147.

7. The photovoltaic cell according to claim 5, wherein (XPO) has a degree of cross-linking of at most 95% by weight, measured according to EIN ISO 10147.

8. The photovoltaic cell according to claim 2, wherein (XPO) has a degree of cross-linking of at most 95% by weight, measured according to EIN ISO 10147.

9. The photovoltaic cell according to claim 2, wherein layer (a) comprises a (PM) selected from the group consisting of polycarbonates, acrylic polymers, polyacrylates, cyclic polyolefins, metallocene-catalyzed polystyrene, polyethylene terephthalate (PET), polyethylene naphthalate, fluoropolymers, and laminates, mixtures or alloys of two or more thereof.

10. The photovoltaic cell according to claim 3, wherein layer (a) comprises a (PM) selected from the group consisting of polycarbonates, acrylic polymers, polyacrylates, cyclic polyolefins, metallocene-catalyzed polystyrene, polyethylene terephthalate (PET), polyethylene naphthalate, fluoropolymers, and laminates, mixtures or alloys of two or more thereof.

11. The photovoltaic cell according to claim 1, which further comprises a solar cell, a second encapsulant layer and a back sheet layer.

12. The photovoltaic cell according to claim 1, wherein $R^1$, $R^2$ and $R^3$ are, independently from each other, a $C_1$-$C_2$ alkoxy group.

13. The photovoltaic cell according to claim 1, wherein $R^1$, $R^2$ and $R^3$ are each a $C_2$ alkoxy group.

14. A process of the preparation of the photovoltaic cell according to claim 1, comprising the steps of:
  i. providing the layer (a),
  ii. applying on at least a portion of the (a) layer of step i a composition comprising the cross-linkable polymer comprising hydrolysable silane groups (SPO), and optionally additives;
  iii. cross-linking (SPO) to obtain the multilayer composition wherein the cross-linked polyolefin (XPO) adheres directly to at least a portion of (a).

* * * * *